May 14, 1963  H. J. KOZICKI  3,089,689
MOTOR VEHICLE SUSPENSION
Filed May 25, 1960
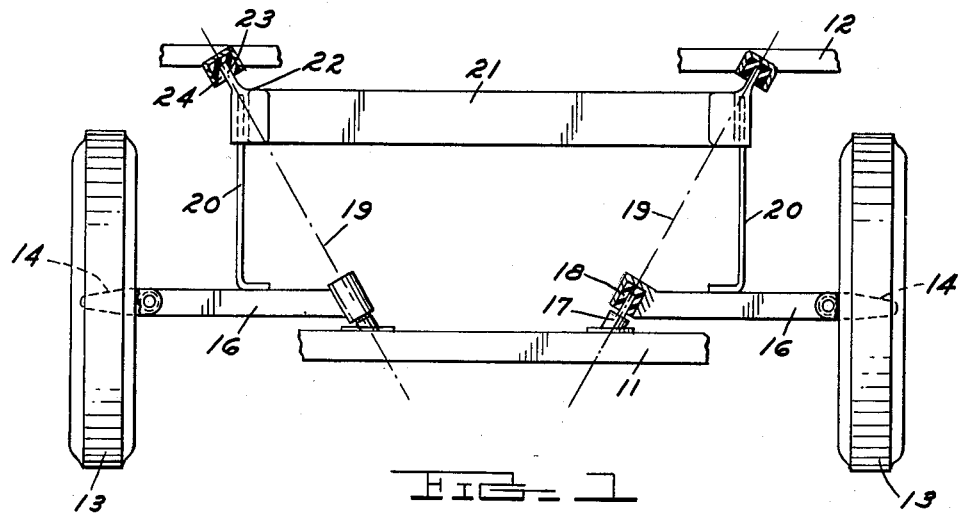
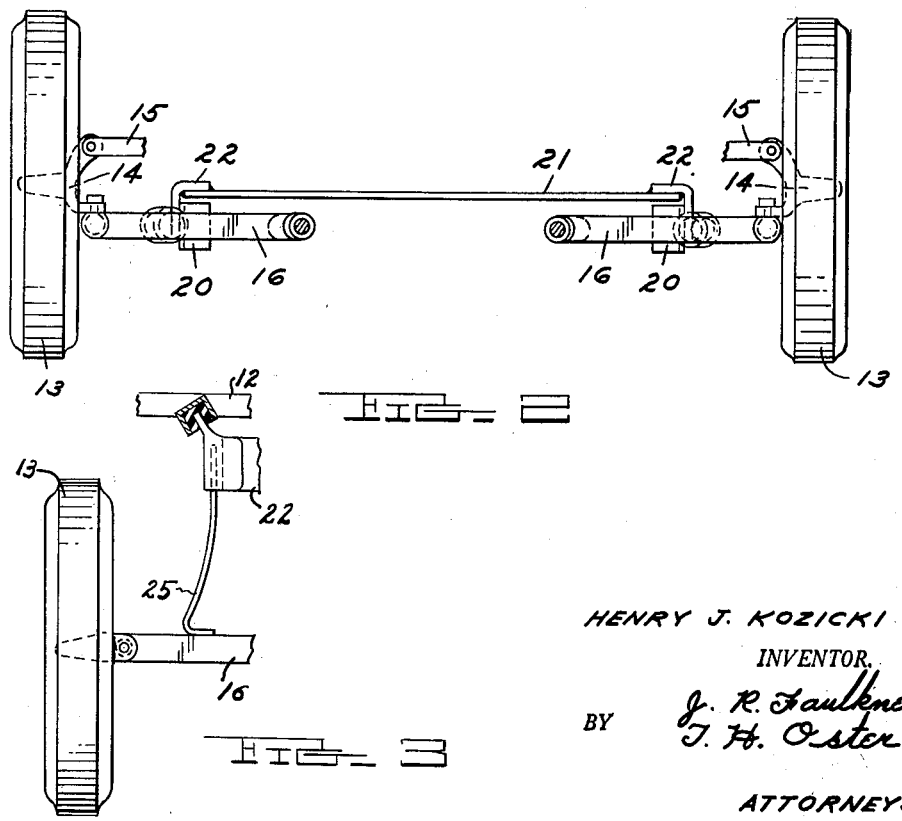
HENRY J. KOZICKI
INVENTOR.
BY J. R. Faulkner
J. H. Oster
ATTORNEYS 3,089,689
MOTOR VEHICLE SUSPENSION
Henry J. Kozicki, Livonia, Mich., assignor to Ford Motor Company, Dearborn, Mich., a corporation of Delaware
Filed May 25, 1960, Ser. No. 31,612
8 Claims. (Cl. 267—11)

This invention relates generally to motor vehicle suspension systems and more particularly to improving the stabilizing means of such vehicles equipped with independent wheel suspensions.

The suspension system embodying the present invention comprises a pair of vertical leaf drag struts which extend longitudinally of the vehicle. Each drag strut is connected at its forward end to a lower arm of the wheel suspension system and at its rearward end to a transversely extending spring member. This spring member comprises a horizontal single leaf spring which is pivotally secured to the frame of a motor vehicle at the connection between the leaf drag strut and the transversely extending spring member.

In a vertical jounce motion of the road wheels of a motor vehicle, the transverse leaf spring yields which allows the vertical leaf struts to twist to give soft ride characteristics to the vehicle. When the vehicle body rolls while cornering, the transverse leaf spring twists along its axis assuming an S shape and causing the leaf struts to twist to a greater degree than in jounce motion, thereby increasing the spring rate to resist body roll.

An object of this invention is to provide a transversely interconnected spring suspension system for the front wheels of a motor vehicle.

Another object of this invention is the elimination of the sway or stabilizer bars used in the front suspension system of most motor vehicles today.

A further object of this invention is to minimize the transmission of road wheel vibrations into the vehicle body through the suspension system.

Various other objects and advantages of this invention will become more apparent from the following description when considered in connection with the accompanying drawings in which:

FIGURE 1 is a plan view of a portion of a motor vehicle chassis incorporating the suspension system of this invention, FIGURE 2 is a front elevational view of the suspension system shown in FIGURE 1, and, FIGURE 3 is a partial plan view of the suspension system incorporating a further embodiment of this invention.

The term "frame" when used in the specification and claims will be understood to refer to either a conventional vehicle frame or a conventional unitary frame and body construction.

In FIGURE 1 is seen crossmembers 11 and 12 of the frame of a motor vehicle chassis. Front road wheels 13 are conventionally mounted upon a spindle support 14 which is pivotally connected at its upper and lower extremities to the outer ends of upper and lower suspension arms 15 and 16. The inner end of the lower suspension arm 16 is pivotally connected by a pivot device 17 to crossmember 11. The pivot device 17 is journaled in an elastic bushing 18 to prevent the transmission of vibration and noise generated by the road wheels 13 from entering the vehicle body. The axis 19 of the pivot device 17 extends generally longitudinally of the vehicle in an outward direction towards the rear of the vehicle.

In FIGURE 1 it can be seen that each suspension arm 16 has secured thereto a longitudinally extending leaf drag strut 20. Each drag strut 20 is connected at its forward end to the lower suspension arm 16 intermediate the pivot device 17 and the road wheel 13. The rearward ends of the leaf struts 20 are interconnected with a transverse single leaf spring 21. The leaf struts 20 may be single vertical leaf springs adapted to twist in torsion during the rising and falling movement of the road wheels 13. The transverse leaf spring 21 is connected at its extremities to the leaf strut 20 by an L shaped connecting member 22. The connecting member 22 has a pivot 23 which is journaled in an elastic bushing 24 mounted in crossmember 12 of the frame of the motor vehicle chassis. The pivot axis 19 of the pivot device 17 also passes through pivot 23. The rising and falling movement of the road wheels 13 swings the lower suspension arm 16 about the pivotal axis 19.

Referring now to FIGURE 3 a further embodiment of this invention is shown in which vertical leaf drag struts 24 are prestressed in an outward direction and then installed in the present interconnected spring suspension system.

It will be readily apparent that by utilizing the construction of this invention a low spring rate is obtained in the jounce and rebound motion of the road wheels since the transverse leaf spring 21 yields which allows a small degree of twist in the vertical single leaf drag struts 20.

When cornering the vehicle, a high spring rate is obtained since, in body roll, the transverse spring member 21 twists along its own axis assuming an S shape which in turn causes the single leaf vertical struts 20 also to twist. The twisting of these vertical drag struts 20 results in the contribution of their rate effect in series with the rate effect of the twisted transverse leaf spring. This brings about a high spring rate which is desirable to resist body roll. If even a greater wheel rate buildup is desired to resist body roll, the vertical struts 24 may be installed in a slightly pre-stressed position in the suspension system as seen in FIGURE 3. This causes a force to be imparted on each lower suspension arm outwardly to make the arm return to its horizontal position at a faster rate.

The utilization of the vertical leaf struts as horizontally extending spring members of the spring suspension system in this invention also results in the absorption of longitudinal forces which occur when the motor vehicle is accelerated or decelerated.

It will be understood that the invention is not to be limited to the exact construction shown and described but that various modifications may be made without departing from the spirit and scope of the invention as defined in the appended claims.

I claim:

1. In a motor vehicle having a frame, a pair of oppositely disposed road wheels and suspension arms for supporting each of said wheels, a first pivotal means for attaching each of said suspension arms at its inner end to said frame, spring means comprising a pair of generally longitudinally extending vertical leaf drag struts, each vertical leaf drag strut being connected at one end to one of said suspension arms, a horizontal single leaf spring extending generally transversely of said vehicle, a pair of connecting members each connecting member connecting the other end of each of said vertical leaf drag strut with said horizontal leaf spring at transversely spaced points, a second pivotal means for attaching each of said connecting members to said frame, the related first and second pivotal means lying on a common axis.

2. The structure defined in claim 1 which is further characterized in that said first and second pivotal means are journaled in elastic bushings mounted in said frame.

3. The structure as defined in claim 1 which is further characterized in that each vertical leaf drag strut is prestressed in an outward direction and then one end of each vertical leaf drag strut is connected to one of said suspension arms intermediate said road wheel and said first pivotal means.

4. In a motor vehicle having a frame member, road wheels, means for supporting each of said wheels for independent rising and falling movement, each of said supporting means having its inner end pivotally connected to said frame member to accommodate the vertical movement of the respective wheel, and spring means comprising a pair of generally longitudinally extending leaf spring members adapted to be loaded in bending and torsion, means connecting each leaf spring member at one end to one of said supporting means, and a cross leaf spring member extending generally transversely of said vehicle and adapted to be loaded in bending and torsion, and means connecting the other ends of said pair of longitudinally extending spring members to said cross leaf spring member and to said frame at transversely spaced points.

5. In a motor vehicle having a frame member, road wheels, means for supporting each of said wheels for independent rising and falling movement, each of said supporting means having its inner end pivotally connected to said frame member to accommodate the movement of the respective wheel, and spring means comprising a pair of generally longitudinally extending leaf spring members adapted to be loaded in bending and torsion, means connecting each leaf spring member at one end to one of said supporting means, and a cross leaf spring member extending generally transversely of said vehicle and adapted to be loaded in bending and torsion, said cross leaf spring member having its extremities pivotally connected to said frame member, and means connecting said pair of longitudinally extending leaf spring members to said cross leaf spring member at transversely spaced points.

6. In a motor vehicle having a frame member, a pair of oppositely disposed road wheels, means for supporting each of said wheels for independent rising and falling movement, and spring means comprising a pair of generally longitudinally extending leaf spring members adapted to be loaded in bending and torsion, one end of each leaf spring member being connected to one of said supporting means, a cross leaf spring member extending generally transversely of said vehicle and adapted to be loaded in bending and torsion, and a pair of connecting members securing the other ends of said longitudinally extending leaf spring members to said cross leaf spring member at transversely spaced points, said connecting members being pivotally connected to said frame member.

7. In a motor vehicle having a frame member, a pair of oppositely disposed road wheels, suspension arms for supporting each of said wheels, each of said suspension arms having its inner end pivotally connected to said frame member, spring means comprising a pair of longitudinally extending vertical leaf drag struts adapted to be loaded in bending and torsion, one end of each drag strut being connected to one of said suspension arms, a cross-spring member extending generally transversely of said vehicle and adapted to be loaded in bending and torsion, and a pair of connecting members connecting the other ends of said vertical leaf drag struts to said cross-spring member at transversely spaced points, said connecting members being pivotally connected to said frame member.

8. In a motor vehicle having a frame, a pair of oppositely disposed road wheels and suspension arms for supporting each of said wheels, each of said suspension arms having it inner end pivotally connected to said frame, spring means comprising a pair of vertical leaf drag struts adapted to be loaded in bending and torsion, one end of each drag strut being connected to one of said suspension arms, a cross-spring member extending generally transversely of said vehicle, said cross-spring member being adapted to be loaded in bending and torsion, and a pair of connecting members connecting the other ends of said drag struts to said cross-spring member at transversely spaced points, said connecting members being pivotally connected to said frame.

References Cited in the file of this patent
UNITED STATES PATENTS

| | | |
|---|---|---|
| 2,097,362 | Best | Oct. 26, 1937 |
| 2,162,843 | Erickson | June 20, 1939 |
| 2,695,791 | Heftler | Nov. 30, 1954 |
| 2,792,216 | Janeway | May 14, 1957 |
| 2,845,279 | Polhemus et al. | July 29, 1958 |